(12) United States Patent
Toyoda

(10) Patent No.: US 12,452,381 B2
(45) Date of Patent: Oct. 21, 2025

(54) ACQUIRING IMAGE DATA VIA COMMUNICATION INTERFACE SWITCHING

(71) Applicant: FUJIFILM Business Innovation Corp., Tokyo (JP)

(72) Inventor: Akihito Toyoda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 454 days.

(21) Appl. No.: 17/873,806

(22) Filed: Jul. 26, 2022

(65) Prior Publication Data

US 2023/0247164 A1    Aug. 3, 2023

(30) Foreign Application Priority Data

Feb. 1, 2022   (JP) .................................. 2022-014028

(51) Int. Cl.
*H04N 1/32*      (2006.01)
*H04N 1/44*      (2006.01)

(52) U.S. Cl.
CPC ..... *H04N 1/32678* (2013.01); *H04N 1/32101* (2013.01); *H04N 1/32358* (2013.01); *H04N 1/4406* (2013.01)

(58) Field of Classification Search
None
See application file for complete search history.

(56) References Cited

U.S. PATENT DOCUMENTS

| | | | |
|---|---|---|---|
| 7,075,682 B1* | 7/2006 | Eguchi | H04N 1/32736 358/437 |
| 2004/0078270 A1* | 4/2004 | Arakawa | H04M 15/51 705/400 |
| 2011/0058203 A1* | 3/2011 | Hwang | G06F 3/1204 358/1.15 |
| 2014/0085654 A1* | 3/2014 | Miyazaki | H04N 1/00209 358/1.13 |
| 2016/0255216 A1* | 9/2016 | Saito | G06F 3/1253 358/1.15 |
| 2017/0055269 A1* | 2/2017 | Fujinami | H04W 76/20 |
| 2017/0126926 A1* | 5/2017 | Saito | H04N 1/00344 |
| 2022/0148348 A1* | 5/2022 | Jordan | G07C 5/0808 |

FOREIGN PATENT DOCUMENTS

| | | |
|---|---|---|
| JP | 2005-208799 A | 8/2005 |
| JP | 2008-17020 A | 1/2008 |
| JP | 2008017020 A  * | 1/2008 |

\* cited by examiner

*Primary Examiner* — Akwasi M Sarpong
*Assistant Examiner* — Pawan Dhingra
(74) *Attorney, Agent, or Firm* — Oliff PLC

(57) ABSTRACT

An information processing device includes a processor configured to: transmit, to a user, first information for acquiring image data using a specific communication interface usable by the user, the image data being generated from reading performed by an image reading device; and transmit, to the user, second information for acquire the image data using another communication interface usable by the user if the specific communication interface usable by the user is changed.

19 Claims, 10 Drawing Sheets

FIG. 5

```
-----------------------------------
The following file was placed in the location below.
File name: 20210713205839.pdf
```
44 ~→ http://172.100.100.246/scanUrl/aaaaa/get.htm
```
Please retrieve the file by the prescribed date and time.
07/14/2021 05:00
After retrieving the file, please access the URL below to
remove the file from the machine.
```
46 ~→ http://172.100.100.246/scanUrl/bbbbb/del.htm
```
Sent by:AAAAA [AAAAA@bbb.com]
-----------------------------------
```

FIG. 6

| USER ID | PASSWORD | EMAIL ADDRESS | USABLE I/F | FILE NUMBER |
|---|---|---|---|---|
| AAA | ******** | AAA@bb.cc | WI-FI | 1, 200, 500 |
| BBB | ******** | BBB@bb.cc | ETHERNET 1 | |
| CCC | ******** | CCC@bb.cc | ETHERNET 2 | 3, 10, 80 |
| DDD | ******** | DDD@bb.cc | ETHERNET 1 | 2, 300, 1000 |
| EEE | ******** | EEE@bb.cc | WI-FI | |

FIG. 8

| USER ID | PASSWORD | EMAIL ADDRESS | USABLE I/F | FILE NUMBER |
|---------|----------|---------------|------------|-------------|
| AAA | ******** | AAA@bb.cc | WI-FI | 1, 200, 500 |
|  |  | FFF@bb.cc | ETHERNET 1 |  |
| BBB | ******** | BBB@bb.cc | ETHERNET 1 |  |
| CCC | ******** | CCC@bb.cc | ETHERNET 2 | 3, 10, 80 |
| DDD | ******** | DDD@bb.cc | ETHERNET 1 | 2, 300, 1000 |
| EEE | ******** | EEE@bb.cc | WI-FI |  |

FIG. 12

| USER ID | PASSWORD | EMAIL ADDRESS | USABLE I/F | FILE NUMBER |
|---|---|---|---|---|
| AAA | ******** | AAA@bb.cc | WI-FI | 1 |
| CCC | ******** | CCC@bb.cc | ETHERNET 2 | 3 |
| DDD | ******** | DDD@bb.cc | ETHERNET 1 | 2, 300, 1000 |

ACQUIRING IMAGE DATA VIA COMMUNICATION INTERFACE SWITCHING

CROSS-REFERENCE TO RELATED APPLICATIONS

This application is based on and claims priority under 35 USC 119 from Japanese Patent Application No. 2022-014028 filed Feb. 1, 2022.

BACKGROUND

(i) Technical Field

The present disclosure relates to an information processing device, an information processing method, and a non-transitory computer readable medium.

(ii) Related Art

In some cases, image data generated from reading performed by an image reading device such as a scanner may be stored in a device such as the image reading device, and another device (for example, a personal computer) may follow instructions given by a user to acquire the image data from the device using a communication interface usable by the user. For example, information for acquiring image data using a communication interface usable by the user (such as an address indicating a storage location where the image data is stored, for example) is transmitted to the user via email or the like. The other device (for example, a personal computer) conceivably acquires the image data by using the information to access the image data.

Japanese Unexamined Patent Application Publication No. 2005-208799 discloses a device that controls access to a storage location where user data is stored according to data that identifies a computer.

Japanese Unexamined Patent Application Publication No. 2008-17020 discloses a communication device including multiple different network connection interfaces.

SUMMARY

However, after information for acquiring image data using a communication interface usable by the user is transmitted to the user, the communication interface usable by the user may change in some cases. In this case, a situation could occur in which the information cannot be used to access and acquire the image data.

Aspects of non-limiting embodiments of the present disclosure relate to acquiring image data generated from reading performed by an image reading device in the case where information for acquiring the image data using a communication interface usable by the user is transmitted to the user, even if the communication interface usable by the user is changed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to: transmit, to a user, first information for acquiring image data using a specific communication interface usable by the user, the image data being generated from reading performed by an image reading device; and transmit, to the user, second information for acquire the image data using another communication interface usable by the user if the specific communication interface usable by the user is changed.

BRIEF DESCRIPTION OF THE DRAWINGS

An exemplary embodiment of the present disclosure will be described in detail based on the following figures, wherein:

FIG. 5 is a diagram illustrating an email containing a URL for downloading image data;

FIG. 6 is a diagram illustrating a management table used to manage user information;

FIG. 8 is a diagram illustrating a management table used to manage user information;

FIG. 12 is a diagram illustrating a management table according to an exemplary modification.

DETAILED DESCRIPTION

Figure 1:
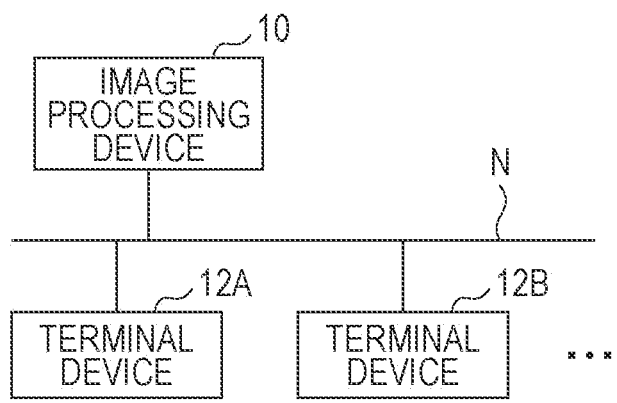
FIG. 1 is a block diagram illustrating a configuration of an information processing system according to an exemplary embodiment.

An information processing system according to an exemplary embodiment will be described with reference to FIG. 1. FIG. 1 is a block diagram illustrating an example of a configuration of an information processing system according to the exemplary embodiment.

The information processing system according to the exemplary embodiment includes an image processing device 10 and one or more terminal devices (for example, terminal devices 12A, 12B, and so on).

The number of terminal devices illustrated in FIG. 1 is merely an example. Hereinafter, the terminal devices 12A, 12B, and so on will be referred to as the "terminal device(s) 12" when not being distinguished individually.

The devices included in the information processing system according to the exemplary embodiment include a function for communicating with other devices. The communication may be wired communication using a cable, or wireless communication. In other words, the devices may transmit and receive information with each other through a physical connection to other devices using a cable, or transmit and receive information with each other by wireless communication. For the wireless communication, a technology such as short-range wireless communication or Wi-Fi (registered trademark) may be used, for example. Wireless communication according to a standard other than the above may also be used. For example, each device may communicate with other devices through a communication channel N such as a local area network (LAN) or the Internet.

The image processing device 10 is an example of an information processing device, and transmits information for acquiring image data generated from reading performed by an image reading device to a user.

The image reading device may be a scanner that generates image data by reading an original document, or an imaging device such as a camera that generates image data by capturing images.

The image reading device may or may not be included in the image processing device 10.

The information for acquiring image data includes an address (for example, a URL) indicating a storage location where the image data is stored. For instance, the information for acquiring image data is transmitted to the user via email, application software for exchanging messages, chat application software, or through a social networking service (SNS) other than the above, for example.

For example, an email address of the user is used to transmit an email containing information for acquiring image data to the user. As another example, an account used with application software for exchanging messages, an account used with chat application software, or an account used with an SNS other than the above may be used to transmit information for acquiring image data to the user.

The image data may be stored in the image processing device 10 or in another device (for example, a server such as a cloud server) other than the image processing device 10.

The image processing device 10 includes one or multiple communication interfaces. Information for acquiring image data is transmitted to the user by using a specific communication interface usable by the user.

The specific communication interface usable by the user is a communication interface with which the user is able to access stored information, for example. Specifically, the specific communication interface is a communication interface that the user is not restricted from accessing, a communication interface that is not malfunctioning, or the like.

In other words, a communication interface that is unusable by the user is a communication interface with which the user is unable to access stored information. Specifically, the unusable communication interface is a communication interface that the user is restricted from accessing, a communication interface that is malfunctioning, or the like.

User access restrictions may be imposed with respect to each communication interface, and access restrictions may be imposed with respect to each user. In this case, if a user on whom access restrictions are imposed is unable to access stored information using a communication interface for which the access restrictions are imposed, the communication interface is a communication interface that is unusable by the user.

The image processing device 10 may be a multi-function device (a device including a scan function, a print function, and a copy function, for example) including the image reading device, the image reading device itself, or some other device that receives image data from the image reading device.

The terminal device 12 is a device such as a personal computer (hereinafter referred to as a "PC"), a tablet PC, a smartphone, or a mobile phone.

Hereinafter, FIG. 2 will be referenced to describe a hardware configuration of the image processing device 10.

Figure 2:
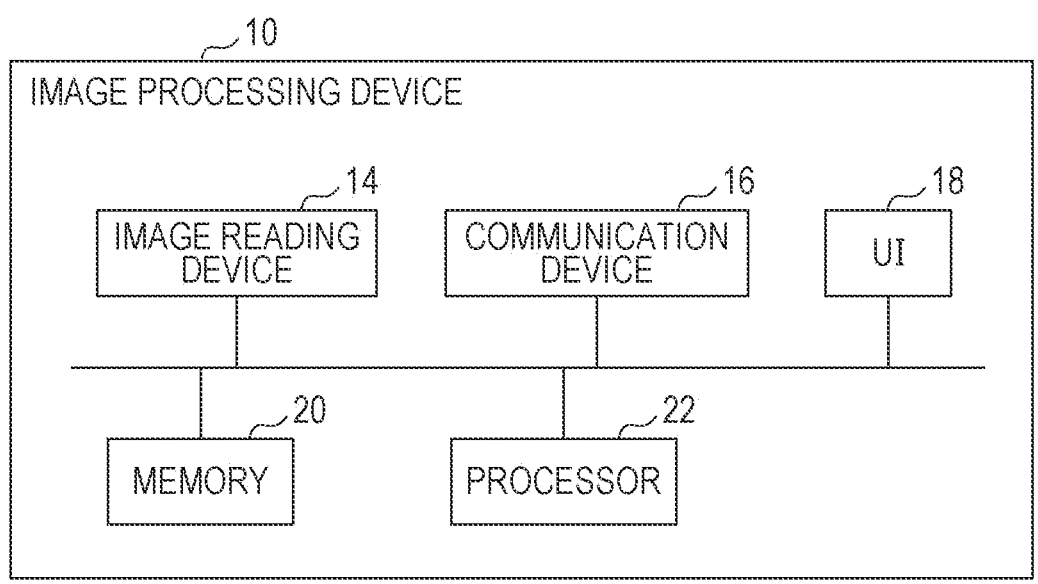
FIG. 2 is a block diagram illustrating a hardware configuration of an image processing device.

FIG. 2 illustrates an example of the hardware configuration of the image processing device 10.

For example, the image processing device 10 includes an image reading device 14, a communication device 16, a user interface (hereinafter referred to as a "UI") 18, a memory 20, and a processor 22. The image reading device 14 is included in the image processing device 10 as an example herein, but this is merely an example, and the image reading device 14 does not have to be included in the image processing device 10.

The image reading device 14 is a scanner or a camera. As an example herein, the image reading device 14 is taken to be a scanner.

The communication device 16 includes one or multiple communication interfaces provided with a component such as a communication chip or a communication circuit, and has a function of transmitting information to another device and a function of receiving information from another device. The communication device 16 may have a wireless communication function, and may also have a wired communication function.

The UI 18 is a user interface, and includes a display and an input device. The display is a liquid crystal display (LCD), an organic light-emitting diode (OLED) display, or the like. The input device is a device such as a keyboard, a mouse, input keys, or a control panel. The UI 18 may also be a UI such as a touch panel combining a display with an input device.

The memory 20 is a device that establishes one or multiple storage locations where data is stored. For example, the memory 20 is a hard disk drive (HDD), a solid-state drive (SSD), any of various types of memory (such as RAM, DRAM, NVRAM, and ROM, for example), another type of storage device (such as an optical disc, for example), or a combination of the above.

For example, image data, programs, various parameters, and data expressing various types of histories are stored in the memory 20. For example, programs and static data are stored in the ROM. The RAM is used as system memory for running programs, page memory for image processing, and the like. Non-volatile data, parameters for adjusting image quality, other types of parameters, and data expressing various types of histories are stored in the NVRAM. Image data and data expressing various types of histories are stored in the HDD. Obviously, the above is merely an example, and a different configuration may also be adopted as the configuration for storing data.

The processor 22 controls operations by each component of the image processing device 10.

Figure 3:
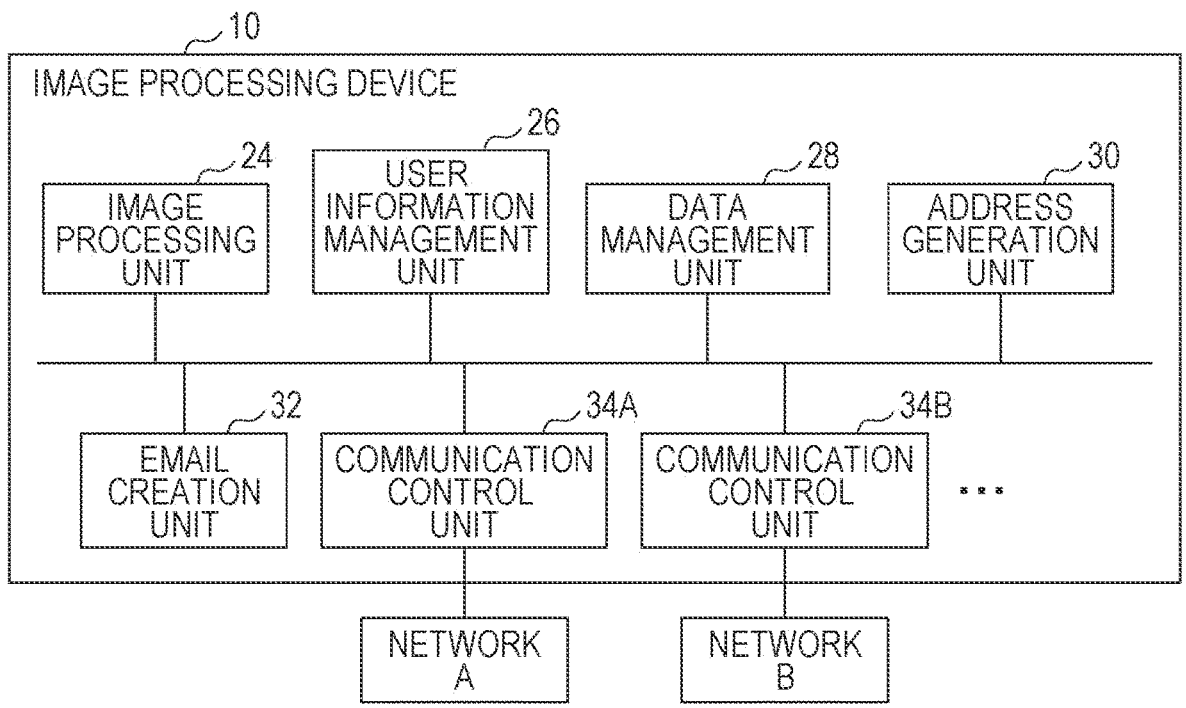
FIG. 3 is a block diagram illustrating functions of an image processing device.

Hereinafter, FIG. 3 will be referenced to describe functions of the image processing device 10. FIG. 3 is a block diagram illustrating functions of the image processing device 10.

The image processing device 10 includes an image processing unit 24, a user information management unit 26, a data management unit 28, an address generation unit 30, an email creation unit 32, and one or multiple communication control units (for example, communication control units 34A, 34B, and so on). Hereinafter, the communication control units 34A, 34B, and so on will be referred to as the "communication control unit(s) 34" when not being distinguished individually.

The image processing unit 24 performs image processing on image data. For example, the image processing unit 24 performs image processing on image data generated from reading performed by the image reading device 14. The image processing includes a compression process, a decompression process, and a character recognition process (such as OCR), for example.

The user information management unit 26 stores user information. The user information includes, for example, user identification information (such as a user ID and a name, for example) for identifying the user, login information (such as a user ID and a password, for example) for logging in to the image processing device 10, information (for example, an email address) indicating a destination of information (for example, address information indicating a storage location where image data is stored) for acquiring image data, information indicating a communication interface usable by the user, and image data identification information (such as a number associated with the image data, for example) for identifying image data generated from reading performed by the image reading device 14.

The data management unit 28 stores image data. For example, image data generated from reading performed by the image reading device 14 is stored. A file containing a set of image data may also be stored in the data management unit 28. Moreover, the processing according to the exemplary embodiment may also be applied to a file.

The address generation unit 30 generates information for acquiring image data generated from reading performed by the image reading device 14. For example, the address generation unit 30 generates an address (for example, a URL) indicating a storage location where image data generated from reading by the image reading device 14 is stored.

The email creation unit 32 creates an email containing an address generated by the address generation unit 30. The email is transmitted to a destination (for example, the user's email address).

The communication control unit 34 is a communication interface that communicates over a communication channel N such as a network. In the example illustrated in FIG. 3, the communication control unit 34A communicates over a network A and the communication control unit 34B communicates over a network B.

The image processing unit 24, the address generation unit 30, the email creation unit 32, and the communication control unit 34 are achieved by the processor 22, for example. The memory 20 may also be used to achieve the above units. The user information management unit 26 and the data management unit 28 are achieved by the memory 20, for example.

Figure 4:
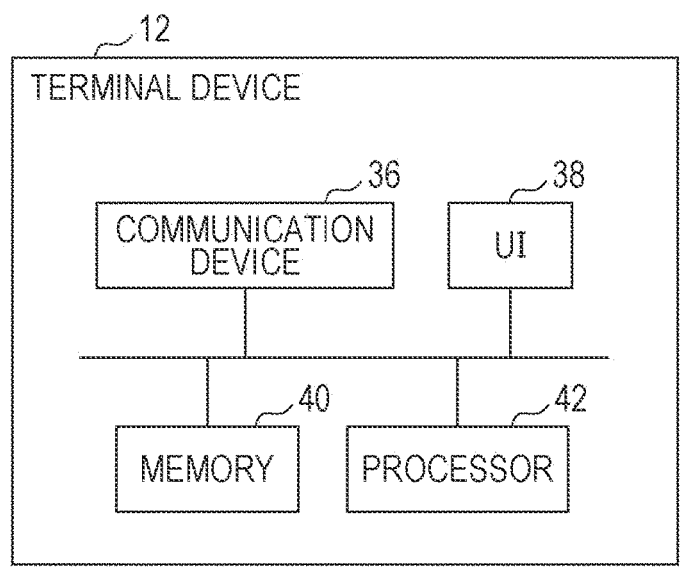
FIG. 4 is a block diagram illustrating a hardware configuration of a terminal device.

Hereinafter, FIG. 4 will be referenced to describe a hardware configuration of the terminal device 12. FIG. 4 illustrates an example of the hardware configuration of the terminal device 12.

The terminal device 12 includes a communication device 36, a UI 38, a memory 40, and a processor 42, for example.

The communication device 36 includes one or multiple communication interfaces provided with a component such as a communication chip or a communication circuit, and has a function of transmitting information to another device and a function of receiving information from another device. The communication device 36 may have a wireless communication function, and may also have a wired communication function.

The UI 38 is a user interface, and includes a display and an input device. The display is a liquid crystal display (LCD), an organic light-emitting diode (OLED) display, or the like. The input device is a device such as a keyboard, a mouse, input keys, or a control panel. The UI 38 may also be a UI such as a touch panel combining a display with an input device.

The memory 40 is a device that establishes one or multiple storage locations where data is stored. For example, the memory 40 is a hard disk drive (HDD), a solid-state drive (SSD), any of various types of memory (such as RAM, DRAM, NVRAM, and ROM, for example), another type of storage device (such as an optical disc, for example), or a combination of the above.

The processor 42 controls operations by each component of the terminal device 12.

Hereinafter, the exemplary embodiment will be described in further detail. As an example in the following, the image reading device 14 is a scanner, and image data generated from scanning by the scanner is stored in a storage location. As an example in the following, the storage location is formed by the data management unit 28 of the image processing device 10, and image data is assumed to be stored in the data management unit 28. Obviously, image data may also be formed in another device (such as a server, for example) other than the image processing device 10. The information for acquiring the image data from the storage location is a URL indicating the storage location. An email containing the URL is transmitted to the user. For example, an email containing the URL is transmitted to an email address registered in the image processing device 10.

A specific example of the above email will be described with reference to FIG. 5. FIG. 5 illustrates an example of an email. A download URL indicated by the sign 44 and a removal URL indicated by the sign 46 are written into the body of the email. Additionally, the name (for example, the file name) of the image data to be downloaded, a time limit on downloading, and the like are also written in the email.

The terminal device 12 receives the email, and in accordance with an instruction from the user, accesses the download URL and downloads image data from the storage location indicated by the URL.

Additionally, the terminal device 12 may, in accordance with an instruction from the user, access the removal URL and transmit an instruction for removing the image data from the storage location where the image is being stored to the device (such as the image processing device 10 or a server, for example) storing the image data. The device storing the image data receives the removal instruction and removes the image data.

Hereinafter, the email containing the download URL is referred to as the "download email". The download email may also include the removal URL as illustrated in FIG. 5, but the removal URL does not have to be included.

In the case where multiple pieces of image data are generated by scanning, a different URL may be generated for each piece of image data, and the download URLs for the image data may be included in the same, single email. In other words, multiple download URLs may be included in the same, single email. If a different URL is generated for each piece of image data, a separate email may also be created for each piece of image data. In this case, a single email contains a single download URL.

Hereinafter, FIG. 6 will be referenced to describe a management table used to manage user information. FIG. 6 illustrates an example of the management table. The user information registered in the management table is managed by the user information management unit 26.

In the management table, a user ID, a password, a download email address, information indicating a usable interface (I/F), and file numbers are associated with each other, for example.

The user ID is an example of user identification information. Also, the user ID and password are an example of login information. The usable I/F is a specific communication interface usable by the user. The file numbers are an example of names of image data generated by scanning.

As an example herein, each usable I/F illustrated in FIG. 6 is a communication interface included in the image processing device 10. In other words, the image processing device 10 includes multiple different communication interfaces. For example, the image processing device 10 includes Wi-Fi (registered trademark), Ethernet (registered trademark) 1, and Ethernet 2. A different IP address is assigned to each communication interface.

For example, the specific communication interface usable by the user AAA is Wi-Fi. The specific communication interface usable by the user BBB is Ethernet 1.

There may be one or multiple specific communication interfaces usable by a single user. For a user who is able to use multiple specific communication interfaces, information indicating each of the multiple specific communication interfaces is associated with the user ID of the user. Although different from the example illustrated in FIG. 6, if, for instance, the user AAA is able to use Wi-Fi and Ethernet 1, Wi-Fi and Ethernet 1 may be registered in the management table as specific communication interfaces usable by the user AAA.

Additionally, multiple email addresses for each user may be registered in the management table.

The user ID, password, download email address information, and information indicating a usable I/F may be registered in the management table in advance or registered in the management table when scanning is performed by the image reading device 14.

If image data is generated from scanning performed by the image reading device 14, the processor 22 of the image processing device 10 registers the file number of the image data in the management table in association with a user ID. For example, the file number of the image data is associated with the user ID of the user logged in to the image processing device 10, the user ID of a user predetermined as the user who will download the image data, or the like.

In the following, a process of storing image data generated from scanning in a storage location and transmitting a download email containing a URL indicating the storage location to a user will be referred to as the "(Scan To URL) process".

Figure 7:
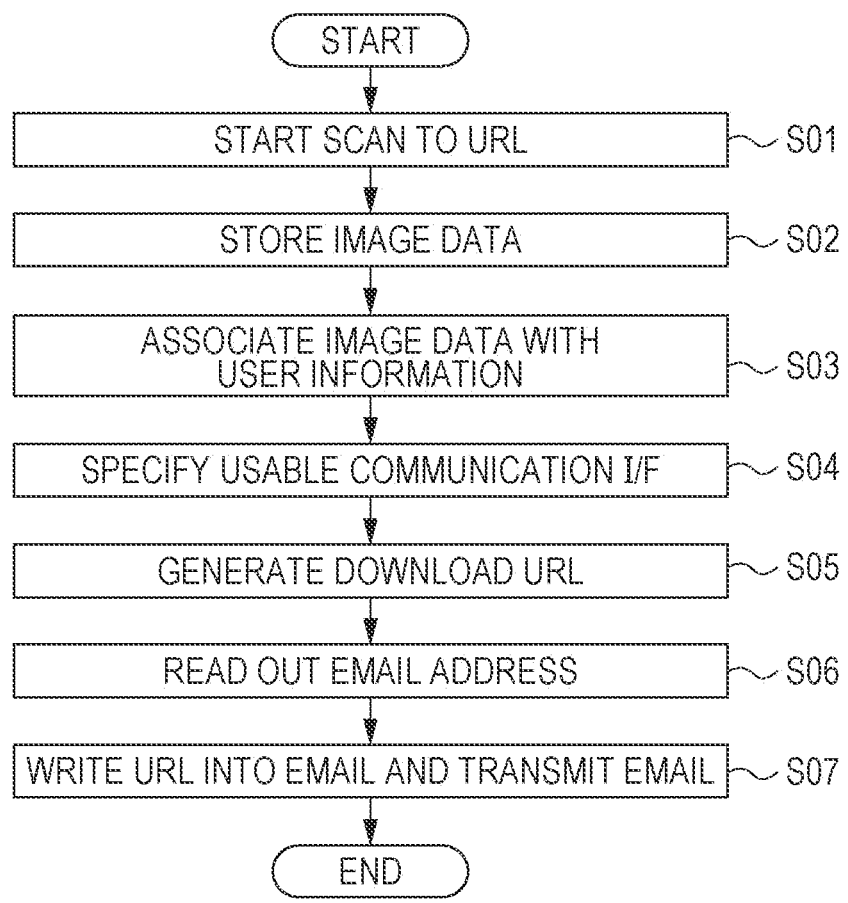
FIG. 7 is a flowchart illustrating the flow of a process by an image processing device.

FIG. 7 will be referenced to describe the flow of the (Scan To URL) process. FIG. 7 is a flowchart illustrating the flow of the (Scan To URL) process.

As an example herein, it is assumed that the user AAA logs in to the image processing device 10 and gives an instruction for performing the (Scan To URL) process. For example, if the user AAA operates the UI 18 of the image processing device 10 to input login information including a user ID and password into the image processing device 10, user authentication information is performed using the login information. User authentication may be performed by the image processing device 10 or by another device (such as an authentication server, for example) other than the image processing device 10. If authentication is successful, the user AAA is allowed to log in to the image processing device 10 and use functions that are made available to a user who is logged in to the image processing device 10. Note that login information may also be stored in an IC card, such that user authentication information is performed by transmitting the login information stored in the IC card from the IC card to the image processing device 10 by wireless communication (for example, short-range wireless communication).

If the user AAA operates the UI 18 of the image processing device 10 to give an instruction for executing the (Scan To URL) process, the processor 22 of the image processing device 10 starts the (Scan To URL) process (S01).

Specifically, the image reading device 14, under control by the processor 22, generates image data by scanning an original document to be scanned. The image data is stored in the data management unit 28 (S02). As an example herein, the image data generated from scanning is stored in the data management unit 28, or in other words the memory 20 of the image processing device 10, but the image data may also be stored in a device (for example, a server) other than the image processing device 10.

Next, the processor 22 associates the image data generated from scanning with the user information about the user AAA (S03). As an example herein, image data with the file number "1", image data with the file number "200", and image data with the file number "500" is generated. The processor 22 registers the file numbers in the management table in association with the user information (for example, the user ID or the email address information of the user AAA) about the user AAA logged in to the image processing device 10.

Next, the processor 22 references the management table, specifies the usable I/F (that is, a specific communication interface usable by the user AAA) associated with the user ID of the user AAA logged into the image processing device 10, and reads out an IP address to be used with the usable I/F (S04). For example, an IP address to be used with each communication interface is pre-stored in the memory 20 of the image processing device 10. Here, it is assumed that the usable I/F associated with the user AAA is "Wi-Fi", and the IP address is "172.100.100.246" (see FIG. 5).

If multiple usable I/Fs are associated with the user ID of the user AAA, the processor 22 may specify one or more predetermined usable I/Fs from among the multiple usable I/Fs and read out the IP address(es) to be used with the one or more usable I/Fs, or the processor 22 may read out the IP addresses for all of the multiple usable I/Fs.

Next, the address generation unit 30 generates a URL (that is, a download URL) for downloading the image data generated from scanning (S05).

The address generation unit 30 generates a different download URL for each piece of image data. Described in terms of a specific example, the address generation unit 30 generates a URL for downloading the image data with the file number "1", a URL for downloading the image data with the file number "200", and a URL for downloading the image data with the file number "500". The URL for downloading the image data with the file number "1" is information indicating the storage location where the image data with the file number "1" is stored. The URL for downloading the image data with the file number "200" is information indicating the storage location where the image data with the file number "200" is stored. The URL for downloading the image data with the file number "500" is information indicating the storage location where the image data with the file number "500" is stored. The URLs include the IP address read out in step S04. In other words, the URLs include the IP address (for example, "172.100.100.246") to be used with the specific communication interface usable by the user AAA.

The download URL generated in step S05 corresponds to an example of first information for using a specific communication interface usable by the user to acquire image data generated from reading performed by the image reading device 14.

In the case where multiple usable I/Fs are associated with the user ID of the user AAA, if the IP address to be used with one usable I/F from among the multiple usable I/Fs is read out, the processor 22 generates a download URL including the IP address. In the case where multiple predetermined IP addresses are read out, the processor 22 may also generate a different download URL for each of the multiple IP addresses. In the case where IP addresses for all of the multiple usable I/Fs are read out, the processor 22 may also generate a different download URL for every one of the IP addresses. In other words, multiple download URLs with different IP addresses may be generated.

Next, the email creation unit 32 reads out, from the management table, the email address associated with the user ID of the user AAA logged in to the image processing device 10 (S06). In the example illustrated in FIG. 6, the email address "AAA@bb.cc" is associated with the user ID of the user AAA, and therefore the email creation unit 32 reads out the email address "AAA@bb.cc".

Next, the email creation unit 32 writes the download URL generated in step S05 into the body of an email, and the processor 22 transmits the email (that is, a download email) to the email address "AAA@bb.cc" of the user AAA (S07). The email creation unit 32 may also write a removal URL into the body of the email.

In the case where multiple pieces of image data are generated from scanning, the email creation unit 32 may create a download email for each piece of image data. In other words, the email creation unit 32 writes the download URL for one piece of image data into the body of one email, and creates an email for each of the multiple pieces of image data. As another example, the email creation unit 32 may write the download URL for each of the multiple pieces of image data into a single email.

In the case where multiple download URLs with different IP address are generated, the email creation unit 32 writes the multiple download URLs into the body of the download email, and the processor 22 transmits the email to the user AAA.

In the case where multiple email addresses are registered in the management table in association with the user ID of the user AAA, the processor 22 may transmit the download email to one or more predetermined addresses from among the multiple email addresses, or transmit the download email to all of the addresses.

If the processor 42 of the terminal device 12A of the user AAA receives the download email, for example, the body of the download email is displayed on a display. With this arrangement, the URL is displayed on the display. If the user AAA operates the terminal device 12A to give an instruction for accessing the URL, the processor 42 of the terminal device 12A accesses the URL. For example, if the URL is written into the body of the email as a link and the user AAA clicks or touches the URL to give the instruction for accessing the URL, the processor 42 of the terminal device 12A accesses the URL. A web browser may be used to access the URL.

When the download URL is accessed, the processor 42 of the terminal device 12A may download the image data stored in the storage location indicated by the URL to the terminal device 12A according to a download instruction from the user AAA, or download the image data to the terminal device 12A without receiving a download instruction from the user AAA.

Also, in the case where a removal URL is written in the download email, if the user AAA operates the terminal device 12A to give an instruction for accessing the removal URL, the processor 42 of the terminal device 12A accesses the URL and transmits an instruction for removing the image data to the image processing device 10. The processor 22 of the image processing device 10 follows the removal instruction and removes the image data stored in the storage location indicated by the download URL. Image data may be removed individually. For example, in the case where the user AAA uses the terminal device 12A to give an instruction for removing the image data with the file number "1", information indicating the instruction is transmitted from the terminal device 12A to the image processing device 10, and the processor 22 of the image processing device 10 removes the image data with the file number "1" from the storage location where the image data is stored.

When image data is downloaded, the processor 22 of the image processing device 10 removes the file number of the image data from the management table. When image is removed, the processor 22 may also remove the file number of the image data from the management table. For example, when the image data with the file number "1" is downloaded or removed, the processor 22 removes the file number "1" associated with the user ID of the user AAA from the management table.

The download email may also be transmitted to multiple users. FIG. 8 will be referenced to describe the above process. FIG. 8 is a modification of the management table used to manage user information.

In the example illustrated in FIG. 8, the address "AAA@bb.cc" of the user AAA and the address "FFF@bb.cc" of the user FFF are associated with the user ID of the user AAA. Also, information indicating the specific communication interface "Wi-Fi" usable by the user AAA and information indicating the specific communication interface "Ethernet 1" usable by the user FFF are associated with the user ID of the user AAA.

The address of the user FFF and the information indicating the specific communication interface usable by the user FFF may be associated with each other and associated with the user ID of the user AAA in advance, or inputted into the image processing device 10 by the user AAA and associated with the user ID of the user AAA after the user AAA logs in to the image processing device 10. For example, the address of the user FFF and the information indicating the specific communication interface usable by the user FFF may be inputted and associated with the user ID of the user AAA before or after scanning is executed.

If the user AAA logs in to the image processing device 10 and the (Scan To URL) process is executed, the process from step S01 to step S06 illustrated in FIG. 7 is executed.

In the process of step S04, the processor 22 of the image processing device 10 references the management table illustrated in FIG. 8, specifies the usable I/Fs (namely, the specific communication interface usable by the user AAA and the specific communication interface usable by the user FFF) associated with the user AAA logged in to the image processing device 10, and reads out the IP address to be used with each usable I/F.

In the process of step S05, the address generation unit 30 generates a URL (that is, a download URL) for downloading the image data generated from scanning. The URL is information indicating the storage location where the image data with the file number "1", the image data with the file number "200", and the image data with the file number "500" are stored. In the example illustrated in FIG. 8, the address generation unit 30 uses the IP addresses read out in step S04 to generate a URL enabling the user AAA to download the image data and a URL enabling the user FFF to download the image data. Since the specific communication interface usable by the user AAA is "Wi-Fi", the address generation unit 30 generates a URL including the IP address (for example, "172.100.100.246") to be used with "Wi-Fi" as the URL for the user AAA. Since the specific communication interface usable by the user FFF is "Ethernet 1", the address generation unit 30 generates a URL including the IP address to be used with "Ethernet 1" as the URL for the user FFF. In this way, in the case where the specific communication interfaces usable by the users AAA and FFF are different, separate URLs are generated for the user AAA and the user FFF.

In the process of step S06, the email creation unit 32 reads out, from the management table illustrated in FIG. 8, the email address associated with the user ID of the user AAA logged in to the image processing device 10. In the example illustrated in FIG. 8, the address "AAA@bb.cc" and the address "FFF@bb.cc" are associated with the user ID of the user AAA, and therefore the email creation unit 32 reads out the email addresses "AAA@bb.cc" and "FFF@bb.cc".

Next, the email creation unit 32 writes the download URLs generated in step S05 into the body of emails. The email creation unit 32 creates a download email to be transmitted to the user AAA by writing the URL for the user AAA (that is, the URL including the IP address to be used with "Wi-Fi") into the body of an email to be transmitted to the user AAA. Similarly, the email creation unit 32 creates a download email to be transmitted to the user FFF by writing the URL for the user FFF (that is, the URL including the IP address to be used with "Ethernet 1") into the body of an email to be transmitted to the user FFF. In this way, in the case where the specific communication interfaces usable by the users AAA and FFF are different, respectively different URLs are written into the download email to be transmitted to the user AAA and the download email to be transmitted to the user FFF. The email creation unit 32 may also write a removal URL into the body of each download email.

The processor 22 of the image processing device 10 transmits the download email to be transmitted to the user AAA to the email address "AAA@bb.cc" of the user AAA, and transmits the download email to be transmitted to the user FFF to the email address "FFF@bb.cc" of the user FFF.

It is thought that the users AAA and FFF will each operate their own terminal device 12 to access the download URL written in their own download email, and download the image data generated from scanning.

When the user AAA downloads the image data, "Wi-Fi" is used as the communication interface. When the user FFF downloads the image data, "Ethernet 1" is used as the communication interface. In this way, the users AAA and FFF each use the specific communication interface usable by themselves to download the image data.

As described above, image data generated from scanning is downloaded using a specific communication interface usable by a user. With regard to the above situation, the specific communication interface usable by the user may change after a download email containing a download URL, which corresponds to an example of first information, is transmitted to a user, and as a result, the user may no longer be able to download image data in some cases.

In the exemplary embodiment, if the specific communication interface usable by a user is changed after a download email containing a download URL, which corresponds to an example of first information, is transmitted to the user, the processor 22 of the image processing device 10 transmits, to the user, second information for acquiring the image data using another communication interface usable by the user. For example, a URL for accessing image data using another communication interface usable by the user corresponds to an example of second information. The URL corresponding to an example of second information includes an IP address to be used with the other communication interface. For example, a download email containing a URL corresponding to an example of second information is transmitted to the user's email address. The user is able to access the URL corresponding to an example of second information and download image data.

Figure 9:
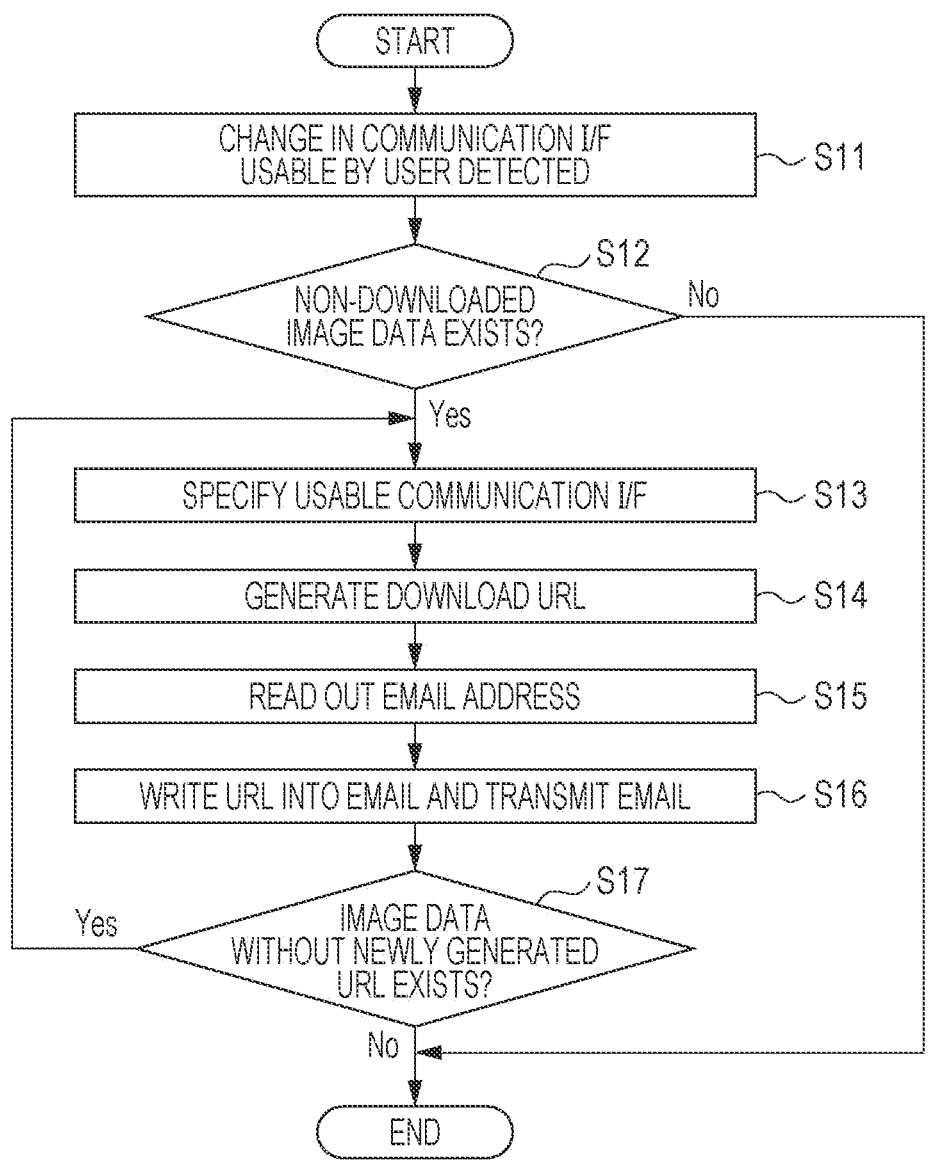
FIG. 9 is a flowchart illustrating the flow of a process by an image processing device.

Hereinafter, FIG. 9 will be referenced to describe in detail the process in the case where a specific communication interface usable by a user is changed. FIG. 9 is a flowchart illustrating a flow of the process.

In the case of detecting that the specific communication interface usable by the user is changed (S11), the processor 22 of the image processing device 10 executes the process from step S12. If such a change is not detected, the processor 22 does not execute the process from step S12.

Examples of the specific communication interface usable by the user being changed include, for instance, the case where access restrictions are imposed on a certain user with respect to a specific communication interface that the user was not restricted from accessing before, and the case where a malfunction occurs in a specific communication interface usable by the user.

The above will be described by citing a specific example. Suppose that Wi-Fi and Ethernet 1 are associated with the user ID of the user AAA and registered in the management table as I/Fs usable by the user AAA. In this case, if Wi-Fi malfunctions or if the user AAA is restricted from using Wi-Fi (that is, if access restrictions are imposed on the user AAA with respect to Wi-Fi), the processor 22 detects that the specific communication interface usable by the user AAA is changed.

Hereinafter, the process from step S12 will be described. As an example in the following, it is assumed that Wi-Fi and Ethernet 1 are associated with the user ID of the user AAA and registered in the management table as I/Fs usable by the user AAA, and access restrictions are imposed on the user AAA with respect to Wi-Fi. Also, the process from steps S13 to S16 is performed on each piece of image data.

If it is detected that the specific communication interface usable the user AAA is changed, the processor 22 determines whether image data not downloaded by the user AAA exists (S12).

As described above, when image data is downloaded, the file number of the downloaded image data is removed from the management table. Consequently, the processor 22 references the management table to determine whether image data not downloaded by the user AAA exists. If a file number is associated with the user ID of the user AAA, it is determined that image data not downloaded by the user AAA exists, whereas if a file number is not associated with the user ID of the user AAA, it is determined that image data not downloaded by the user AAA does not exist.

The file number of image data does not have to be removed from the management table even if the image data is downloaded. In this case, when image data is downloaded, a flag indicating that the image data has been downloaded is associated with the file number of the image data and registered in the management table. The processor 22 determines whether image data has been downloaded according to the presence or absence of the flag. Otherwise, if image data has not been downloaded, a flag indicating that the image data has not been downloaded may be associated with the file number of the image data, and the processor 22 may determine whether the image data has been downloaded according to the presence or absence of the flag.

If image data not downloaded by the user AAA does not exist (step S12, No), the process ends.

If image data not downloaded by the user AAA exists (step S12, Yes), the processor 22 references the management table, specifies another communication interface usable by the user AAA, and reads out the IP address of the other communication interface (S13). As an example herein, access restrictions are imposed with respect to Wi-Fi, but Ethernet 1 remains as a communication interface usable by the user AAA, and therefore the processor 22 reads out the IP address to be used with Ethernet 1.

Next, similarly to step S05 described above, the address generation unit 30 generates a URL (that is, a download URL) for downloading the image data that has not been downloaded (S14). The URL includes the IP address read out in step S13 (for example, the IP address to be used with Ethernet 1). The URL generated in step S14 corresponds to an example of second information.

Next, the email creation unit 32 reads out, from the management table, the email address associated with the user ID of the user AAA for whom the usable communication interface is changed (S15). For example, the email address "AAA@bb.cc" is associated with the user ID of the user AAA, and therefore the email creation unit 32 reads out the email address "AAA@bb.cc".

Next, the email creation unit 32 writes the download URL generated in step S14 into the body of an email, and the processor 22 transmits the email (that is, a download email) to the email address "AAA@bb.cc" of the user AAA (S16). The email creation unit 32 may also write a removal URL into the body of the email.

If image data without a new URL generated in step S14 exists (S17, Yes), the process returns to step S13, and the process from step S13 to step S16 is executed with respect to the relevant image data.

If image data without a new URL generated in step S14 does not exist (S17, No), the process ends.

As described above, if the specific communication interface usable by the user is changed in the case where image data has not been acquired from the data management unit 28 (that is, in the case where image data has not been downloaded), a download URL which is an example of second information for acquiring the image data is generated, and a download email containing the URL is transmitted to the user.

On the other hand, if image data has been acquired from the data management unit 28 (that is, if image data has been downloaded), a download URL for acquiring the image data is not generated, and a download email containing the URL is not transmitted to the user.

A process will be described for the case where the specific communication interface usable by a user is changed in the situation in which, as described with reference to FIG. 8, a download email containing a URL (that is, an example of first information) for acquiring image data using a specific communication interface usable by each user is transmitted to multiple users. In this case, if the specific communication interface usable by a user is changed, the processor 22 transmits, to the user, second information for using another communication interface usable by the user to acquire the image data.

As an example herein, it is assumed that a download email containing a download URL including the IP address to be used with Wi-Fi has already been transmitted to the user AAA, and a download email containing a download URL including the IP address to be used with Ethernet 1 has already been transmitted to the user FFF, as illustrated in FIG. 8.

In this case, if the I/F usable by the user AAA is changed from Wi-Fi to a different communication interface (Ethernet 1, for example), the processor 22 transmits a download email containing a download URL (an example of second information) including the IP address to be used with Ethernet 1 to the email address of the user AAA.

Similarly, if the I/F usable by the user FFF is changed from Ethernet 1 to a different communication interface (Wi-Fi, for example), the processor 22 transmits a download email containing a download URL (an example of second information) including the IP address to be used with Wi-Fi to the email address of the user FFF.

In the example illustrated in FIG. 8, if both of the users AAA and FFF have downloaded image data, for example, the processor 22 of the image processing device 10 may remove the downloaded image data from the data management unit 28.

As another example, if one user among multiple users downloads image data, the processor 22 may remove the downloaded image data from the data management unit 28. For example, if the user AAA or the user FFF downloads image data, the processor 22 removes the downloaded image data from the data management unit 28.

As another example, if either the user AAA or the user FFF gives an instruction for removing image data, the processor 22 may notify each user other than the instructing user by, for example, emailing information indicating that an instruction for removing the image data has been given. In this case, the processor 22 removes the image data after a predetermined amount of time elapses from when the instruction for removing the image data was given.

As another example, when the last user among the users AAA and FFF has downloaded image data, the processor 22 may remove the image data from the data management unit 28.

Figure 10:
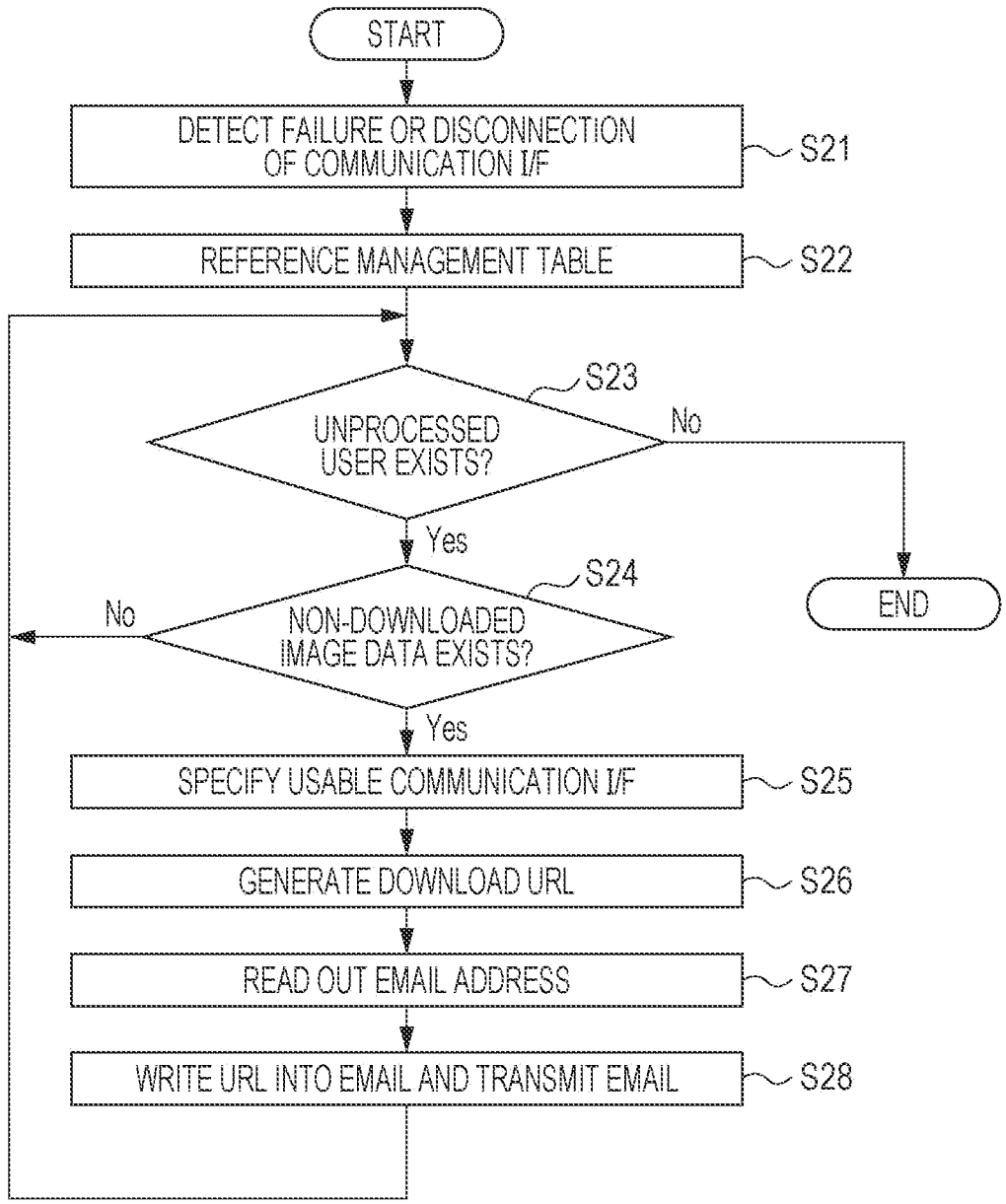
FIG. 10 is a flowchart illustrating the flow of a process by an image processing device.

If a communication interface included in the image processing device 10 malfunctions or is disconnected, the processor 22 may transmit the above second information to a user. Hereinafter, this process will be described with reference to FIG. 10. FIG. 10 is a flowchart illustrating a flow of the process.

In the case of detecting that a communication interface is malfunctioning or disconnected (S21), the processor 22 of the image processing device 10 executes the process from step S22. If a malfunction or disconnection is not detected, the processor 22 does not execute the process from step S22.

As an example in the following, it is assumed that Wi-Fi and Ethernet 1 are associated with the user ID of the user AAA and registered in the management table as I/Fs usable by the user AAA, and a malfunction of disconnection of Wi-Fi is detected.

In step S22, the processor 22 references the management table (for example, the management table illustrated in FIG. 6 or 8).

The processor 22 executes the process in each step from step S23 with respect to each user registered in the management table. For example, the processor 22 detects each user in the management table from top to bottom and executes the process in each step from step S23 with respect to each user.

If a user is not detected from the management table and a user for whom the process in each step from step S24 has not been executed does not exist (S23, No), the process ends.

If an unprocessed user for whom the process in each step from step S24 exists (S23, Yes), the processor 22 executes the process in each step from step S24.

For example, if the process in each step from step S24 has not been executed for the user AAA, the processor 22 executes the process in each step from step S24 with respect to the user AAA.

In step S24, the processor 22 determines whether image data not downloaded by the user AAA exists, similarly to step S12.

If image data not downloaded by the user AAA does not exist (S24, No), the process proceeds to step S23. If another unprocessed user (such as the user BBB, for example) exists, the process in each step from step S24 is executed with respect to the other user. If another unprocessed user does not exist, the process ends.

If image data not downloaded by the user AAA exists (S24, Yes), the processor 22 references the management table, specifies another communication interface usable by the user AAA, and reads out the IP address of the other communication interface (S25). As an example herein, Wi-Fi is malfunctioning or disconnected, but Ethernet 1 remains as a communication interface usable by the user AAA, and therefore the processor 22 reads out the IP address to be used with Ethernet 1.

Next, similarly to step S05 described above, the address generation unit 30 generates a URL (that is, a download URL) for downloading the image data that has not been downloaded (S26). The URL includes the IP address read out in step S25 (for example, the IP address to be used with Ethernet 1). The URL generated in step S26 corresponds to an example of second information.

Next, the email creation unit 32 reads out, from the management table, the email address associated with the user ID of the user AAA (S27). For example, the email address "AAA@bb.cc" is associated with the user ID of the user AAA, and therefore the email creation unit 32 reads out the email address "AAA@bb.cc".

Next, the email creation unit 32 writes the download URL generated in step S26 into the body of an email, and the processor 22 transmits the email (that is, a download email) to the email address "AAA@bb.cc" of the user AAA (S28). The email creation unit 32 may also write a removal URL into the body of the email. Subsequently, the process proceeds to step S23.

In the case where a download URL is generated and an email is created for each piece of image data, the process from step S25 to step S28 is executed for all pieces of image data that the user AAA has not downloaded.

When the process for the user AAA is completed, the process from step S24 to step S28 is also executed for another user (such as the user BBB, for example).

If another communication interface usable by the user does not exist, the processor 22 may allow the user to use another communication interface, but with the use limited to an operation of acquiring image data (that is, limited to downloading image data).

As an example, a case will be described in which the image processing device 10 includes Ethernet 1 and 2 as communication interfaces, and Ethernet 2 is malfunctioning. As illustrated in FIG. 6, the user CCC is able to use Ethernet 2 only and is unable to use Ethernet 1. If Ethernet 2 malfunctions, the user CCC normally would be unable to download image data using Ethernet 1, but the processor 22 allows the user CCC to use Ethernet 1 with the use limited to downloading image data having a file number associated with the user ID of the user CCC. In this case, a download URL that includes the IP address to be used with Ethernet 1 is generated, a download email containing the URL is created, and the email is transmitted to the email address of the user CCC. The processor 22 allows the user CCC to access the URL written in the email. With this arrangement, the user CCC is able to download image data from the URL. On the other hand, the processor 22 restricts use of Ethernet 1 by the user CCC for purposes other than accessing the URL.

If a communication interface usable by a user is changed, the user may still be able to use a communication interface used to acquire image data even after the change in some cases. In such cases, the processor 22 does not transmit the second information described above to the user after the communication interface usable by the user is changed.

For example, as illustrated in FIG. 6, in the case where the communication interface usable by the user AAA is Wi-Fi, and the communication interface usable by the user AAA is changed from Wi-Fi to Wi-Fi and Ethernet 1, the processor 22 does not transmit the second information described above to the user AAA.

Figure 11:
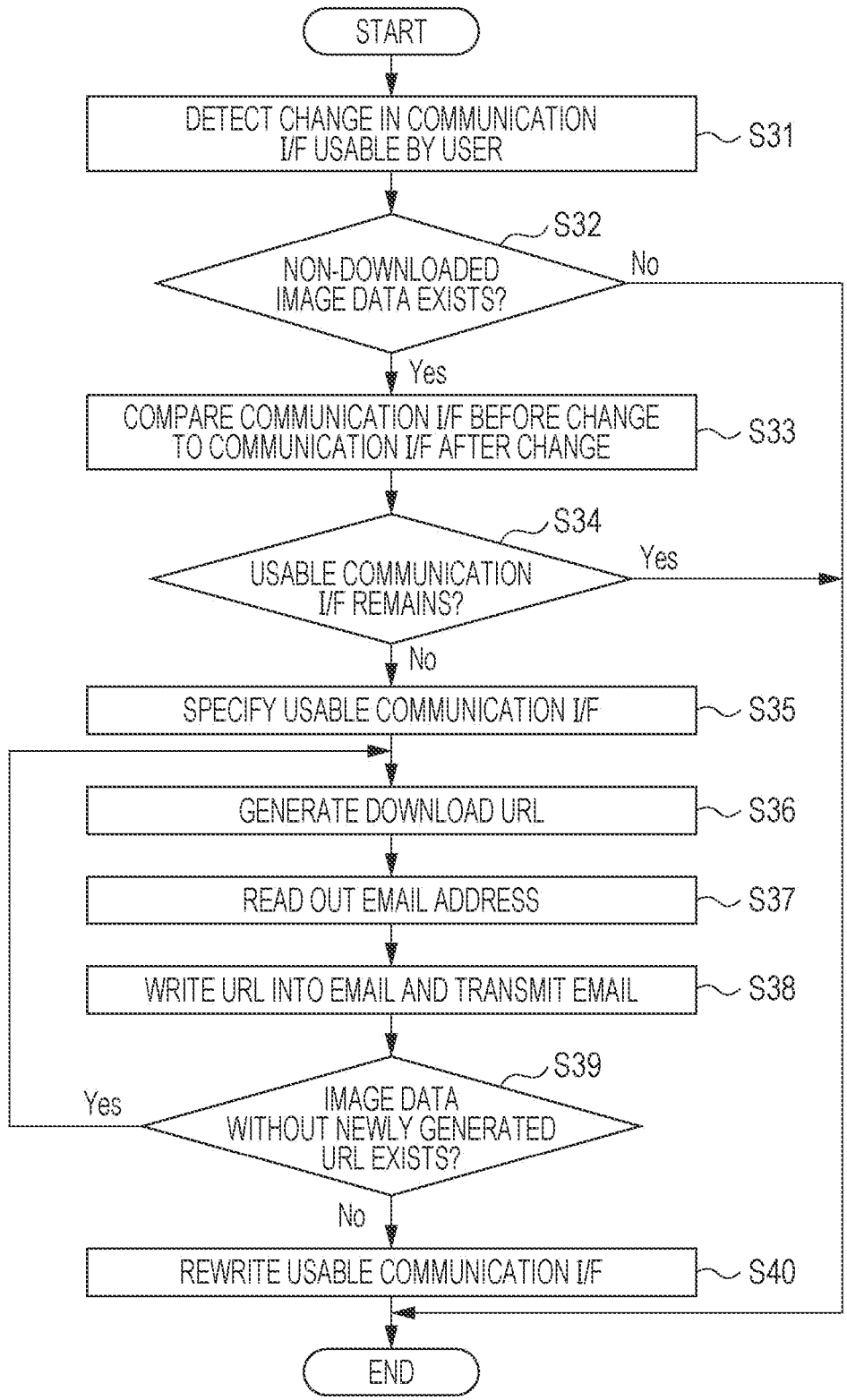
FIG. 11 is a flowchart illustrating the flow of a process by an image processing device.

Hereinafter, this process will be described with reference to FIG. 11. FIG. 11 is a flowchart illustrating a flow of the process.

In the case of detecting that the communication interface usable by a user (for example, the user AAA) is changed (S31), the processor 22 of the image processing device 10 executes the process from step S32. If such a change is not detected, the processor 22 does not execute the process from step S32.

If it is detected that the communication interface usable the user AAA is changed, the processor 22 determines whether image data not downloaded by the user AAA exists (S32).

If image data not downloaded by the user AAA does not exist (step S32, No), the process ends.

If image data not downloaded by the user AAA exists (step S32, Yes), the processor 22 compares the communication interface usable by the user AAA before the communication interface usable the user AAA was changed (in other words, the usable I/F before the change) to the communication interface usable by the user AAA after the communication interface usable by the user AAA was changed (in other words, the usable I/F after the change) (S33).

If a communication interface usable by the user AAA before the change is still usable by the user AAA after the change (S34, Yes), the process proceeds to step S40. For example, in the case where the communication interface usable by the user AAA was Wi-Fi before the change, and the communication interface usable by the user AAA is changed from Wi-Fi to Wi-Fi and Ethernet 1, the process proceeds to step S40. In this case, the user AAA is able to download image data using Wi-Fi from before the change, and therefore a URL corresponding to an example of second information is not transmitted to the user AAA. In step S40, the processor 22 rewrites the usable I/F associated with the user ID of the user AAA in the management table (S40). For example, the processor 22 rewrites the usable I/F associated with the user ID of the user AAA from Wi-Fi to Wi-Fi and Ethernet 1.

If the communication interface that was usable by the user AAA before the change is not usable by the user AAA after the change (S34, No), the processor 22 specifies another communication interface usable by the user AAA, and reads out the IP address for the other communication interface (S35). For example, in the case where the communication interface usable by the user AAA was Wi-Fi before the change, and the communication interface usable by the user AAA is changed from Wi-Fi to Ethernet 1, the processor 22 reads out the IP address to be used with Ethernet 1.

Next, similarly to step S05 described above, the address generation unit 30 generates a URL (that is, a download URL) for downloading the image data that has not been downloaded (S36). The URL includes the IP address read out in step S35 (for example, the IP address to be used with Ethernet 1). The URL generated in step S36 corresponds to an example of second information.

Next, the email creation unit 32 reads out, from the management table, the email address associated with the user ID of the user AAA for whom the usable communication interface is changed (S37). For example, the email address "AAA@bb.cc" is associated with the user ID of the user AAA, and therefore the email creation unit 32 reads out the email address "AAA@bb.cc".

Next, the email creation unit 32 writes the download URL generated in step S36 into the body of an email, and the processor 22 transmits the email (that is, a download email) to the email address "AAA@bb.cc" of the user AAA (S38). The email creation unit 32 may also write a removal URL into the body of the email.

If image data without a new URL generated in step S36 exists (S39, Yes), the process returns to step S36, and the process from step S36 to step S38 is executed with respect to the relevant image data.

If image data without a new URL generated in step S36 does not exist (S39, No), the processor 22 rewrites the usable I/F associated with the user ID of the user AAA in the management table (S40). For example, the processor 22 rewrites the usable I/F associated with the user ID of the user AAA from Wi-Fi to Ethernet 1.

Hereinafter, an exemplary modification of the exemplary embodiment will be described. In the exemplary modification, user authentication when logging in to the image processing device 10 is performed by an authentication device (for example, an authentication server) which is a device other than the image processing device 10. In this case, the information indicating the user ID, password, email address, and usable I/F in the management tables illustrated in FIGS. 6 and 8 is managed in the authentication device, and is not continually managed in the image processing device 10.

In the exemplary modification, if user authentication information is successful when logging in to the image processing device 10, the information indicating the user ID, password, email address, and usable I/F from among the user information about the successfully authenticated user is transmitted from the authentication device to the image processing device 10 and stored in the user information management unit 26. Thereafter, if the (Scan To URL) process illustrated in FIG. 7 is executed, a file number of image data generated from scanning is associated with the user ID of the user who gave the instruction to execute the (Scan To URL) process. Additionally, the user information about a user who has downloaded all image data associated with him- or herself is removed from the user information management unit 26 of the image processing device 10. The user information about a user who has non-downloaded image data is stored in the user information management unit 26 of the image processing device 10. In other words, the user information about a user is stored in the user information management unit 26 until image data is downloaded and acquired by the user.

FIG. 12 illustrates an example of a management table according to the exemplary modification. The management table illustrated in FIG. 12 is managed by the user information management unit 26.

In the example illustrated in FIG. 12, user information about each of the users AAA, CCC, and DDD is registered in the management table. For example, the users AAA, CCC, and DDD are each authenticated by an authentication device, and as a result, information indicating the user ID, password, email address, and usable I/F for each of the users AAA, CCC, and DDD is transmitted from the authentication device to the image processing device 10, stored in the user information management unit 26, and registered in the management table.

One or multiple pieces of image data are generated by scanning performed in accordance with operations by the user AAA, and the file number "1" of the image data generated from the scanning is associated with the user ID of the user AAA. If image data associated with the user ID of the user AAA is downloaded by the user AAA, the file number of the downloaded image data is removed from the management table. Image data having a file number that has not been removed from the management table is image data that has not been downloaded. The image data with the file number "1" is image data that has not been downloaded by the user AAA.

The same applies to the users CCC and DDD. For example, the image data with the file number "3" has not been downloaded by the user CCC, and therefore the file number "3" is associated with the user ID of the user CCC.

Supposing, given the management circumstances illustrated in FIG. 12, that the user AAA downloads the image data with the file number "1", the processor 22 of the image processing device 10 removes the user information about the user AAA from the user information management unit 26. In other words, the processor 22 removes the user information about the user AAA from the management table illustrated in FIG. 12.

Also, suppose that the user DDD downloads the image data with the file number "2". In this case, the processor 22 of the image processing device 10 removes the file number "2" from the management table. At this stage, the image data with the file number "300" and the image data with the file number "1000" have not been downloaded by the user DDD, and therefore the processor 22 does not remove the file numbers "300" and "1000" from the management table.

As above, in the exemplary modification, user information is managed by the authentication device, and the user information about a user who has non-downloaded image data is stored in the user information management unit 26 of the image processing device 10 and registered in the management table.

Figure 13:
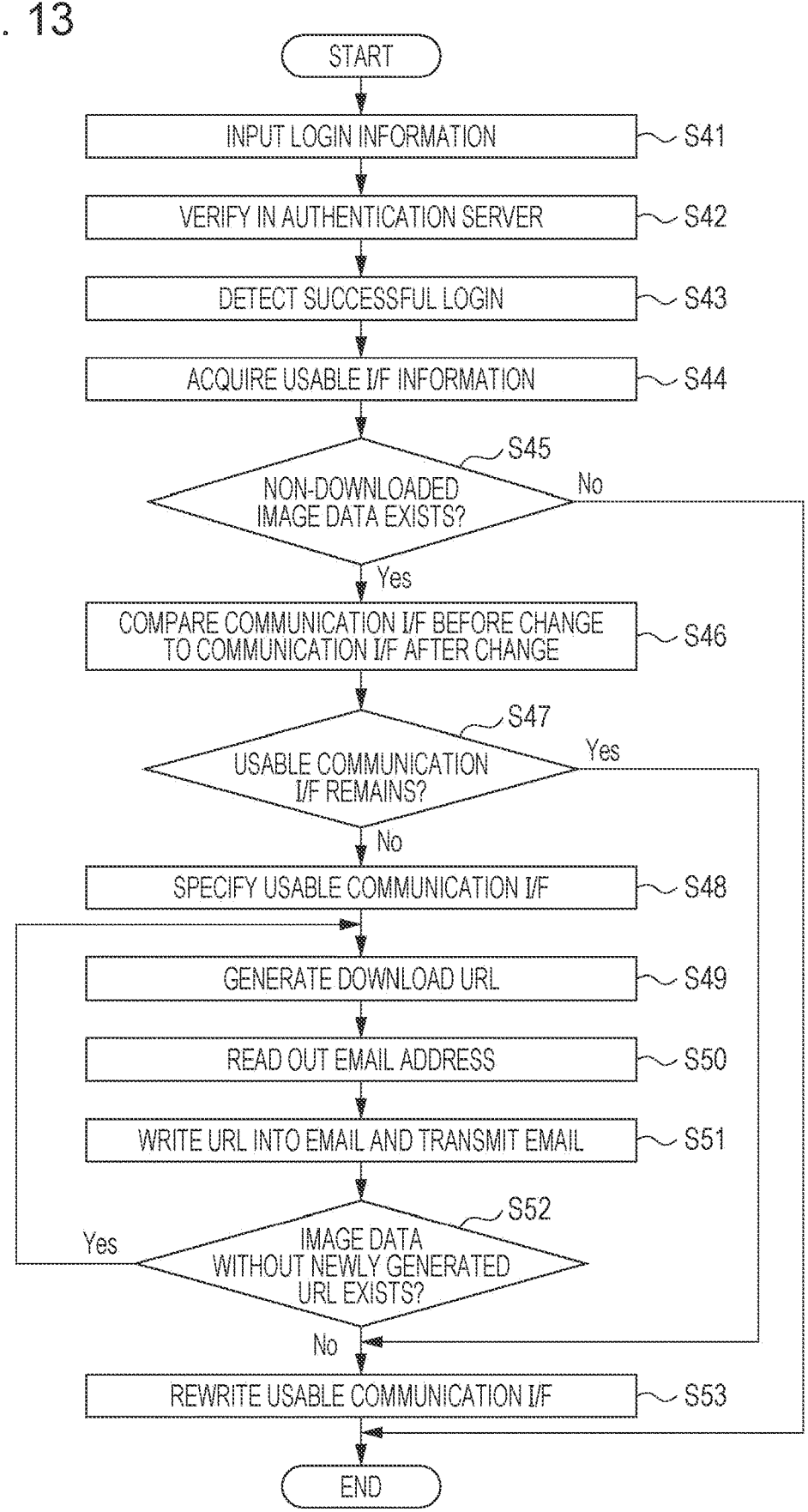
FIG. 13 is a flowchart illustrating the flow of a process according to an exemplary modification.

Hereinafter, FIG. 13 will be referenced to describe the process in the case where user information is managed in this way, and the communication interface usable by a user is changed. FIG. 13 is a flowchart illustrating the flow of the process according to the exemplary modification.

First, a user (for example, the user AAA) inputs his or her own login information (for example, a user ID and password) into the image processing device 10 (S41).

The inputted login information is transmitted from the image processing device 10 to an authentication server as one example of an authentication device, and is verified by the authentication server (S42). If authentication is successful as a result of the verification of the login information, information indicating a successful authentication is transmitted from the authentication server to the image processing device 10. If authentication is unsuccessful, information indicating an unsuccessful authentication is transmitted from the authentication server to the image processing device 10. If authentication is successful, the user AAA is allowed to log in to the image processing device 10. If authentication is unsuccessful, the user AAA is not allowed to log in to the image processing device 10, and the process ends. Hereinafter, the case where authentication is successful will be described.

The processor 22 of the image processing device 10 receives the information indicating a successful authentication from the authentication server and detects a successful login (S43).

Next, the processor 22 acquires, from the authentication server, information indicating the usable I/F managed by the authentication server as the communication interface usable by the user AAA at the present time (S44).

Next, the processor 22 references the information (that is, the management table) stored in the user information management unit 26 to determine whether image data not downloaded by the user AAA exists (S45).

If image data not downloaded by the user AAA does not exist (step S45, No), the process ends. In this case, user information about the user AAA is not registered in the management table stored in the user information management unit 26, and therefore the processor 22 determines that image data not downloaded by the user AAA does not exist.

If image data not downloaded by the user AAA exists (S45, Yes), the processor 22 compares the usable I/F associated with the user ID of the user AAA in the management table stored in the user information management unit 26 (in other words, the usable I/F before the change) to the usable I/F acquired from the authentication server in step S44 (that is, the usable I/F after the change) (S46).

If the information indicating the usable I/F associated with the user ID of the user AAA in the management table stored in the user information management unit 26 is included in the information indicating the usable I/F acquired from the authentication server in step S44, or in other words, if a communication interface usable by the user AAA before the change is still usable by the user AAA after the change (S47, Yes), the process proceeds to step S53. For example, if the usable I/F associated with the user ID of the user AAA in the management table stored in the user information management unit 26 is Wi-Fi and the usable I/F acquired from the authentication server in step S44 is Wi-Fi, a communication interface usable by the user AAA remains, and therefore the process proceeds to step S53. In this case, the user AAA is able to download image data using Wi-Fi, and therefore a URL corresponding to an example of second information is not transmitted to the user AAA. In step S53, the processor 22 rewrites the usable I/F associated with the user ID of the user AAA in the management table. In the above example, the usable I/F is not changed, but suppose that the usable I/F is changed from Wi-Fi to Wi-Fi and Ethernet 1. In this case, the processor 22 rewrites the usable I/F associated with the user ID of the user AAA in the management table from Wi-Fi to Wi-Fi and Ethernet 1.

If the information indicating the usable I/F associated with the user ID of the user AAA in the management table stored in the user information management unit 26 is not included in the information indicating the usable I/F acquired from the authentication server in step S44, or in other words, if a communication interface usable by the user AAA before the change is not usable by the user AAA after the change (S47, No), the processor 22 specifies another communication interface usable by the user AAA and reads out the IP address of the other communication interface (S48). For example, if the usable I/F associated with the user ID of the user AAA in the management table stored in the user information management unit 26 is Wi-Fi and the usable I/F acquired from the authentication server in step S44 is Ethernet 1, the processor 22 reads out the IP address to be used with Ethernet 1. The IP address may be stored in the memory 20 of the image processing device 10 or transmitted from the authentication server to the image processing device 10.

Next, similarly to step S05 described above, the address generation unit 30 generates a URL (that is, a download URL) for downloading the image data that has not been downloaded (S49). The URL includes the IP address read out in step S48 (for example, the IP address to be used with Ethernet 1). The URL generated in step S49 corresponds to an example of second information.

Next, the email creation unit 32 reads out, from the management table, the email address associated with the user ID of the user AAA (S50).

Next, the email creation unit 32 writes the download URL generated in step S49 into the body of an email, and the processor 22 transmits the email (that is, a download email) to the email address "AAA@bb.cc" of the user AAA (S51). The email creation unit 32 may also write a removal URL into the body of the email.

If image data without a new URL generated in step S49 exists (S52, Yes), the process returns to step S49, and the process from step S49 to step S51 is executed with respect to the relevant image data.

If image data without a new URL generated in step S49 does not exist (S52, No), the processor 22 rewrites the usable I/F associated with the user ID of the user AAA in the management table stored in the user information management unit 26 (S53). For example, the processor 22 rewrites the usable I/F associated with the user ID of the user AAA from Wi-Fi to Ethernet 1.

As above, in the case where the usable I/F is managed in the authentication server, too, if the communication interface usable by a user is changed, an email containing a URL for downloading image data using a communication interface usable by the user after the change is transmitted to the user.

The functions of the image processing device 10 above are realized by the cooperative action of hardware and software as an example. For instance, the functions are achieved by causing a processor to load and execute a program stored in a memory of each device. The program is stored in the memory through a recording medium such as a CD or DVD, or alternatively through a communication channel such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising: a processor configured to: transmit, to a user, first information for acquiring image data using a specific communication interface usable by the user, the image data being generated from reading performed by an image reading device; transmit, to the user, second information for acquire the image data using another communication interface usable by the user if the specific communication interface usable by the user is changed, cause information indicating the specific communication interface to be stored in a memory until the image data is acquired by the user; acquire, from an authentication device which manages one or a plurality of communication interfaces usable by the user and which authenticates the user who logs in to the information processing device, information indicating the one or a plurality of communication interfaces usable by the user if the user is authenticated and logs in to the information processing device; and transmit, to the user, information for acquiring the image data using a communication interface included among the one or a plurality of communication interfaces managed by the authentication device in a case where information indicating the specific communication interface stored in the memory is not included in the information indicating the one or plurality of communication interfaces acquired from the authentication device.

2. The information processing device according to claim 1, wherein:
the image data is stored in a memory;
the first information and the second information is information for acquiring the image data from the memory; and
the processor is configured to transmit the second information to the user if the specific communication interface is changed in a case where the image data has not been acquired from the memory, and not transmit the second information to the user in a case where the image data has been acquired from the memory.

3. The information processing device according to claim 1, wherein the processor is configured to transmit the second information to the user in a case where the specific communication interface malfunctions or is disconnected.

4. The information processing device according to claim 2, wherein the processor is configured to transmit the second information to the user in a case where the specific communication interface malfunctions or is disconnected.

5. The information processing device according to claim 3, wherein, in a case where another communication interface usable by the user does not exist, the processor is configured allow the user to use another communication interface with the use limited to an operation of acquiring the image data.

6. The information processing device according to claim 4, wherein, in a case where another communication interface usable by the user does not exist, the processor is configured allow the user to use another communication interface with the use limited to an operation of acquiring the image data.

7. The information processing device according to claim 1, wherein, in a case where the specific communication interface usable by the user is changed but a communication interface to be used for acquiring the image data is usable by the user, the processor is configured to not transmit the second information to the user after the specific communication interface usable by the user is changed.

8. The information processing device according to claim 2, wherein, in a case where the specific communication interface usable by the user is changed but a communication interface to be used for acquiring the image data is usable by the user, the processor is configured to not transmit the second information to the user after the specific communication interface usable by the user is changed.

9. The information processing device according to claim 3, wherein, in a case where the specific communication interface usable by the user is changed but a communication interface to be used for acquiring the image data is usable by the user, the processor is configured to not transmit the second information to the user after the specific communication interface usable by the user is changed.

10. The information processing device according to claim 4, wherein, in a case where the specific communication interface usable by the user is changed but a communication interface to be used for acquiring the image data is usable by the user, the processor is configured to not transmit the second information to the user after the specific communication interface usable by the user is changed.

11. The information processing device according to claim 5, wherein, in a case where the specific communication interface usable by the user is changed but a communication interface to be used for acquiring the image data is usable by the user, the processor is configured to not transmit the second information to the user after the specific communication interface usable by the user is changed.

12. The information processing device according to claim 6, wherein, in a case where the specific communication interface usable by the user is changed but a communication interface to be used for acquiring the image data is usable by the user, the processor is configured to not transmit the second information to the user after the specific communication interface usable by the user is changed.

13. The information processing device according to claim 2, wherein the processor is configured to:
cause information indicating the specific communication interface to be stored in a memory until the image data is acquired by the user;
acquire, from an authentication device which manages one or a plurality of communication interfaces usable the user and which authenticates the user who logs in to the information processing device, information indicating the one or plurality of communication interfaces usable by the user if the user is authenticated and logs in to the information processing device; and
transmit, to the user, information for acquiring the image data using a communication interface included among the one or a plurality of communication interfaces managed by the authentication device in a case where information indicating the specific communication interface stored in the memory is not included in the information indicating the one or plurality of communication interfaces acquired from the authentication device.

14. The information processing device according to claim 3, wherein the processor is configured to:
cause information indicating the specific communication interface to be stored in a memory until the image data is acquired by the user;
acquire, from an authentication device which manages one or a plurality of communication interfaces usable the user and which authenticates the user who logs in to the information processing device, information indicating the one or plurality of communication interfaces usable by the user if the user is authenticated and logs in to the information processing device; and
transmit, to the user, information for acquiring the image data using a communication interface included among the one or plurality of communication interfaces managed by the authentication device in a case where information indicating the specific communication interface stored in the memory is not included in the information indicating the one or plurality of communication interfaces acquired from the authentication device.

15. The information processing device according to claim 4, wherein the processor is configured to:
cause information indicating the specific communication interface to be stored in a memory until the image data is acquired by the user;
acquire, from an authentication device which manages one or a plurality of communication interfaces usable the user and which authenticates the user who logs in to the information processing device, information indicating the one or plurality of communication interfaces usable by the user if the user is authenticated and logs in to the information processing device; and
transmit, to the user, information for acquiring the image data using a communication interface included among the one or plurality of communication interfaces managed by the authentication device in a case where information indicating the specific communication interface stored in the memory is not included in the information indicating the one or plurality of communication interfaces acquired from the authentication device.

16. The information processing device according to claim 1, wherein the processor is configured to:
transmit, to a plurality of users, first information for acquiring image data using a specific communication interface usable by each user; and
transmit, to each user, second information for acquiring the image data using another communication interface usable by the user to if the specific communication interface usable by the user is changed.

17. The information processing device according to claim 16, wherein:
the image data is stored in a memory;
the first information and the second information is information for acquiring the image data from the memory; and
the processor is configured to remove the image data from the memory if one of the plurality of users has acquired the image data stored in the memory.

18. An information processing method comprising: transmitting, to a user, first information for acquiring image data using a specific communication interface usable by the user, the image data being generated from reading performed by an image reading device; and transmitting, to the user, second information for acquire the image data using another communication interface usable by the user if the specific communication interface usable by the user is changed causing information indicating the specific communication interface to be stored in a memory until the image data is acquired by the user; acquiring, from an authentication device which manages one or a plurality of communication interfaces usable by the user and which authenticates the user who logs in to an information processing device, information indicating the one or a plurality of communication interfaces usable by the user if the user is authenticated and logs in to the information processing device; and transmitting, to the user, information for acquiring the image data using a communication interface included among the one or a plurality of communication interfaces managed by the authentication device in a case where information indicating the specific communication interface stored in the memory is not included in the information indicating the one or plurality of communication interfaces acquired from the authentication device.

19. A non-transitory computer readable medium storing a program causing a computer to execute a process comprising: transmitting, to a user, first information for acquiring image data using a specific communication interface usable by the user, the image data being generated from reading performed by an image reading device; and transmitting, to the user, second information for acquire the image data using another communication interface usable by the user if the specific communication interface usable by the user is changed causing information indicating the specific communication interface to be stored in a memory until the image data is acquired by the user; acquiring, from an authentication device which manages one or a plurality of communication interfaces usable by the user and which authenticates the user who logs in to an information processing device, information indicating the one or a plurality of communication interfaces usable by the user if the user is authenticated and logs in to the information processing device; and transmitting, to the user, information for acquiring the image data using a communication interface included among the one or a plurality of communication interfaces managed by the authentication device in a case where information indicating the specific communication interface stored in the memory is not included in the information indicating the one or plurality of communication interfaces acquired from the authentication device.

* * * * *